United States Patent Office 3,803,249
Patented Apr. 9, 1974

3,803,249
VAPOR PHASE CONVERSION OF ACETONE TO 3,5-XYLENOL IN A SINGLE STAGE
Robert W. Rieve, Springfield, Pa., assignor to Atlantic Richfield Company, Los Angeles, Calif.
No Drawing. Continuation-in-part of application Ser. No. 243,481, Apr. 12, 1972. This application Dec. 29, 1972, Ser. No. 319,427
Int. Cl. C07c 37/00
U.S. Cl. 260—621 R            11 Claims

ABSTRACT OF THE DISCLOSURE

Method for the vapor phase conversion of acetone to 3,5-xylenol in a single stage over a magnesium oxide catalyst in the presence of water and a hydrocarbon as diluents. The advantages of this invention are excellent single stage selectivity to 3,5-xylenol, high conversions of acetone per pass, high ultimate yields and maintenance of catalyst activity after successive conversion-regeneration cycles.

CROSS REFERENCE TO RELATED APPLICATION

This application is a continuation-in-part of my copending application Ser. No. 243,481 filed Apr. 12, 1972, entitled Vapor Phase Conversion of Acetone to 3,5-Xylenol in a Single Stage.

BACKGROUND OF THE INVENTION

This invention relates to a process by which acetone is converted to 3,5-xylenol in a single stage vapor phase reaction over a magnesium oxide catalyst in the presence of a hydrocarbon diluent and preferably also in the presence of water. The advantages of this process are those which accrue to a process using but a single stage as compared with those having previously been accomplished in two stages and in addition high selectivities, high conversions and high ultimate yields can be obtained while also maintaining catalyst activity stability.

It has been reported that 3,5-xylenol is an excellent substitute for phenol in the preparation of resinous adhesives with formaldehyde. It also has commercial and potentially commercial uses as an intermediate in the preparation of various insecticides, pesticides, plastics and similar useful commercial products. One method of production of this compound is by the two-stage condensation process starting with acetone.

Condensation reactions of acetone have been studies for more than 75 years. It has long been known that many acids and bases will catalyze a variety of acetone condensation reactions in the liquid phase to give compounds such as mesityl oxide, phorone, isophorone, mesitylene, xylitones, xylitols and higher molecular weight unsaturated ketones many of which have not been completely characterized.

Examples of these processes are shown in a large number of patents and literature references. For example, U.S. Pat. No. 3,337,633 (1967), shows condensation of acetone in the presence of sodium hydroxide in the liquid phase at temperatures of 100° C. to 250° C. and at elevated pressures to produce isophorone and U.S. Pat. No. 3,497,558 (1970), shows the condensation of acetone in the liquid phase with potassium hydroxide to give mesityl oxide, isophorone and higher boiling compounds. Other patents show combinations of basic compounds in liquid phase condensation reaction to produce isophorone or mesityl oxide or combinations of these products.

Vapor phase condensation reactions of acetone also have been reported, for example U.S. 2,183,127 (1939), contacts acetone with calcium carbide or with either hydrated or anhydrous lime in the vapor phase at temperatures of from 200° C. to 700° C. preferably about 350° C. It is pointed out that under the conditions of the reaction the calcium carbide will be hydrolyzed to the calcium oxide or hydroxide. One example shows a yield of 17.5 percent of isophorone based on the acetone employed. Other examples show a small amount of mesityl oxide and other condensation products were also obtained, more of which was identified. It is further stated the isophonone appeared to be equivalent to about 85 percent by weight of the condensation products produced.

British Pat. 610,752, to Standard Oil Development (1948), shows the vapor phase condensation of acetone over various catalysts prepared by depositing a slurry of oxides on steel turnings, one such catalyst contained 94 percent magnesium oxide and 6 percent vanadium pentoxide. The condensation was carried out at temperatures of from 200° C. to 600° C., preferably 350° C. to 450° C. and at pressures of atmosphere or higher. There were obtained saturated and unsaturated products such as mesityl oxide and secondary butyl alcohol. Hydrogen was required for the activation of the catalyst used during the runs. U.S. 3,155,730 (1964), shows the vapor phase condensation of acetone over brucitic limestone (70.5 percent calcium carbonate, 27.5 percent magnesium oxide, 2.0 percent silicon dioxide), which had been calcined at 400° C. to 800° C. for from 0.5 to 6 hours. At a temperature of 700° F. under 10 p.s.i.g. and at L.H.S.V. of 0.5 cc./cc./hr. and hydrogen rate of 190.6 std. cu. ft./bbl. there was produced 7.1 weight percent mesityl oxide with small amounts of other products and 84.4 weight percent of unreacted acetone.

In an article in the "Journal of Chemical Society of Japan," vol. 63, pages 1285–98 (1942), it was reported that when acetone was heated with magnesium oxide at 340° C. there was produced mesityl oxide, isophorone, methanol, CO and $H_2$. Similar results are shown in both patents and technical literature in the liquid or vapor phase processes for the condensation of acetone.

A number of patents show the conversion of the condensation products of acetone such as obtained by the above described processes to 3,5-xylenol. For example, British Pat. No. 584,256 Shell Development Company (1947), shows the non-catalytic pyrolysis of cyclic ketones to produce phenolic compounds, e.g. isophorone is converted to 3,5-xylenol with a 39 percent yield utilizing temperatures ranging between 668° and 676° C. with a contact time of 2.3 seconds. Another British Pat. No. 588,099, also Shell Development Company (1947), shows conversion of isophorone to 3,5-xylenol over an activated alumina-iron oxide catalyst at 400° C. to 650° C.

It is obvious that the liquid phase condensation and the vapor phase reactions cannot be combined into a single step. It does not appear however, that heretofore vapor phase acetone condensation reactions have been successful in producing 3,5-xylenol in a single stage. It appears that the actone is first condensed to isophorone using a particular catalyst and reaction conditions and, thereafter, either with no catalyst or a different catalyst, the isophorone is pyrolyzed to the 3,5-xylenol generally using considerably higher temperature.

SUMMARY OF THE INVENTION

It has now been found that acetone can be converted in a single stage at relatively high conversions and yields to 3,5-xylenol by employing a magnesium oxide catalyst in a vapor phase reaction at temperatures of from about 700° F to 950° F. and at atmospheric or superatmospheric pressures and as an additional improvement, a hydrocarbon and water is introduced into the reaction together with the acetone to improve the selectivity, conversion and maintain catalyst activity over successive conversion-regeneration cycles. The instant invention therefore avoids the necessity of employing a two-stage reaction system and as will be shown also provides a method for extreme high ultimate conversions of acetone to the 3,5-xylenol by employing recycle of the by-products.

It is an object of this invention therefore to provide a method for the conversion of acetone to 3,5-xylenol.

It is an additional object of this invention to provide a method for the conversion of acetone to 3,5-xylenol in a single stage vapor phase reaction.

It is an additional object of this invention to provide a method for the conversion of acetone to 3,5-xylenol at extremely high ultimate selectivities.

It is another object of this invention to provide a method for the conversion of acetone to 3,5-xylenol and also maintaining the activity of the catalyst over successive conversion-regeneration cycles.

Other objects of this invention will be apparent from the description of the preferred embodiments and from the claims.

DESCRIPTION OF THE PREFERRED EMBODIMENTS

Although the reaction is operable with pure acetone and is improved when water up to 50 weight percent is admixed with the acetone it is preferred in order to attain the objects of the instant invention that the reaction mixture contains in addition to the acetone 1 to 30 weight percent water and from about 5 to 50 weight percent hydrocarbon (both based on total weight of the mixture) as diluents since the water and hydrocarbon not only improve selectivity and conversion but also maintain catalyst stability, i.e. its activity, over successive conversion-regeneration cycles. Preferably the amount of water is in the range of 3 to 25 weight percent and the hydrocarbon is in the range of from 5 to 30 weight percent.

The hydrocarbons which can be used in the method of this invention are the alkanes and aromatics having from 6 to 20 carbon atoms. The alkanes can be straight or branched chain, cyclic, cyclic with alkyl side chains or mixtures of two or more of such alkanes, for example, as might be found in a petroleum naphtha fraction. Aromatic hydrocarbons likewise can be employed, for example, benzene, naphthalene, the alkylated aromatics, Tetralin and the like. Not all of these various hydrocarbons are preferred, however, since many of them boil so near the boiling point of the 3,5-xylenol product that separation by simple distillation is not possible. For example, Tetralin gives excellent results, but under the conditions of the reaction. Tetralin is almost completely dehydrogenated to naphthalene and naphthalene boils within about 1° C. above the 3,5-xylenol, so accordingly irrespective of the excellent improvement in selectivity and conversion as well as catalyst stability the separation problems make these hydrocarbons less preferred.

From the standpoint of improvement in selectivity, conversion and maintenance of catalyst stability (activity) as well as ease of separation the hexanes and benzene are the most preferred hydrocarbons. Of course, the hydrocarbons in the high molecular weight range also give the desired improvements and have sufficiently high boiling points to permit ease of separation but in general these are frequently more expensive and difficult to handle.

The olefinic hydrocarbons cannot be employed as diluents since they undergo reactions with the acetone under the conditions of the reaction. Thus the hydrocarbon diluents are limited to the alkanes and aromatics described.

The reactants can be introduced into the reaction zone in liquid form, wherein these are vaporized and contacted with pelleted form catalyst in a fixed bed or with powder if a fluidized catalyst system is employed. The geometric configuration of the reactor can be conventional for either type of vapor phase reaction. The catalyst can be pure magnesium oxide, however, commercial magnesium oxide catalysts such as Harshaw grade Mg-0601 are preferred since they are produced specifically for catalytic use in particular as to their physical properties such as surface area, pore volume, density and the like. They also are provided in pelleted form, for example, conventional ⅛ inch pellets, which are completely satisfactory for fixed beds. It has been found that other basic metal oxides sucuh as calcium oxide on inert alumina or calcium oxide-sodium hydroxide combinations give very low selectivities for the production of the xylenol and instead produce predominantly isophorone and mesityl oxide as set forth in the prior art discussed above. It has also been found that the magnesium oxide catalyst may contain small amounts for example up to 10 weight percent of other oxides such as chromia ($Cr_2O_3$), iron oxide, molybdenum trioxide and the like. These catalysts however, are not generally preferred since although they may give higher conversions per pass they also give somewhat poorer selectivities for the production of condensation products such as 3,5-xylenol or products that could be recycled for the production of the xylenol. Consequently, the most preferred catalysts are commercial magnesium oxide catalysts. The results obtained with various catalysts are set forth in Example I.

The preferred reaction temperature is in the range of from 700° to 950° F. with from 750° to 925° F. being somewhat more preferable and from 800° F. to 900° F. being the most preferable. Pressures can range from atmospheric to 100 atmospheres, however pressures from 1 atmosphere to 100 p.s.i.g. are preferred. The liquid hourly space velocity, i.e. volumes of acetone per volume of catalyst per hour, can range from 0.01 to 5.0 with from 0.25 to 1.0 being preferred. As in conventional practice with vapor phase reactions, the temperature, space velocity, and pressure can be optimized to give the best yields for any particular process design and catalyst activity.

The following examples are provided for the purpose of illustrating the invention.

Example I

Acetone was fed to a vicor glass reactor suspended in a vertical electric furnace. The reactor was charged with 100 cc. of the various catalyst shown in Table I. The pressure in each experiment was 1 atmosphere, the space velocity was 0.25 cc. of acetone/cc. catalyst/hr., the temperature for each experiment is given in the table.

TABLE I

|  | (1) | (2) | (3) | (4) | (5) |
|---|---|---|---|---|---|
| Catalyst | 10% CaO on $Al_2O_3$ | 10% NaOH 90% CaO | Pure MgO | Com. MgO cat. | 10% $Cr_2O_3$ on com. MgO cat. |
| Temp., °F | 900 | 850 | 750 | 750 | 750 |
| Mole percent conversion | 9.4 | 28.3 | 39.4 | 43.1 | 49.4 |
| Mole percent selectivity to— | | | | | |
| 3,5-xylenol | 3.0 | 4.0 | 5.8 | 17.9 | 14.7 |
| Isophorone | 5.4 | 23.6 | 35.5 | 33.3 | 15.8 |
| Mesityl oxide | 76.8 | 39.2 | 28.0 | 23.0 | 18.2 |

NOTES:
(1) CaO impregnated as $Ca(NO_3)_2$ on inert alpha $Al_2O_3$ calcined in air at 950° F.
(2) NaOH impregnated on CaO and calcined in air at 950° F.
(3) Reagent grade, calcined to 950° F. in air.
(4) Grade Mg-0601, Harshaw Chem. Co. calcined to 950° F. in air.
(5) Catalyst (4) impregnated with $CrO_3$ and calcined to 950° F. in air.

It will be seen from the table that calcium oxide and calcium oxide with sodium hydroxide are very poor catalysts for the production of 3,5-ylenol. In additional experiments it was found that no conversion of acetone occurred over the alpha alumina alone at 900° F. and when the reagent grade magnesium oxide was combined with 20 percent sodium hydroxide only 8 percent conversion of acetone was obtained at 800° F.

The reagent grade magnesium oxide after pelleting and calcining was found to have a total pore volume of 0.965 cc. per gram. From cumulative pore volume measurements in cc. per gram the material was found to be almost entirely in the range of from 350 angstroms in diameter to 3,500 angstroms in diameter.

The commercial magnesium oxide catalyst, however, had a total pore volume of only 0.25 cc./gram and from the cumulative pore volume it was found that substantially the entire catalyst had pores in the range of from 200 angstroms in diameter to about 350 angstroms in diameter. Thus it will be seen that the commercial magnesium oxide catalyst which showed both higher conversion and higher selectivity was characterized by having a desired fine pore structure. The commercial catalyst was also characterized by having a surface area in the range of from 25-32 m.²/gm. with the particular sample employed having 28 m.²/gm. The apparent bulk density of this catalyst is typically 56 lbs./cu. ft. and the crushing strength is in the range of 19-24 lbs. The commercial catalyst from spectrographic analysis shows lines ranging in intensity from very faint trance to weak of Al, Bi, Cr, Cu, Fe, Pb, Mn, Mo, Ni, Si, Na and V with slightly stronger Ca line and a very strong Mg line. The commercial catalyst also shows that the only crystalline component is MgO with a crystallite size of about 230 angstroms at 1.214 peak.

These data in Table I also show that magnesium oxide catalysts are effective at lower temperatures than the calcium oxide catalysts which are substantially ineffective as known from the prior art.

Athough the addition of other oxides such as chromia increases conversion they decrease greatly the selectivity for 3,5-xylenol and isophorone and other compounds which could be eventually converted to 3,5-xylenol as shown in a following example.

Example II

In order to show the effect of reaction temperature; runs were conducted as in Example I utilizing, however, the commercial magnesium oxide catalyst (4) of Example I. These data are set forth in Table II with only the principal products obtained being shown.

TABLE II

| Temperature, °F | 700 | 800 | 900 | 950 |
|---|---|---|---|---|
| Mole percent conversion | 39.9 | 42.4 | 42.5 | 34.9 |
| Mole percent selectivity to— | | | | |
| 3,5-xylenol | 4.3 | 22.6 | 39.7 | 23.7 |
| Isophorone | 44.5 | 22.0 | 4.2 | 1.4 |
| Mesityl oxide | 28.8 | 27.6 | 34.8 | 43.1 |

It will be seen from these data that the acetone conversion and selectivity pass through a maximum between about 900° F. and 950° F. at the same time the isophorone decreases and the mesityl oxide increases.

It is known that the reactions leading to these compounds are reversible so that they can interchange as temperature affects the reaction equilibrium:

2 acetone ⇌ mesityl oxide + $H_2O$

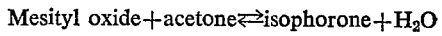

Mesityl oxide + acetone ⇌ isophorone + $H_2O$

The reaction leading to 3,5-xylenol is not reversible:

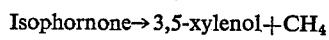

Isophornone → 3,5-xylenol + $CH_4$ so that recycle of mesityl oxide and isophorone will increase the yield of 3,5-xylenol.

Example III

In order to determine the ultimate possible conversion of acetone a simulated recycle feed was employed using the same experimental procedure and catalyst as employed in Example II. The reactor feed was 40 weight percent acetone, 25 weight percent mesityl oxide, 25 weight percent isophorone, and 10 weight percent water, although in general, the acetone content would be somewhat higher and the isophorone content considerably lower as shown by the analyses in the preceding examples. The product distribution from a run made at 900° F. is shown in Table III.

TABLE III

| | Wt. percent |
|---|---|
| Lt. gas (mostly $CH_4$) | 7.3 |
| Acetone | 43.4 |
| Mesityl oxide | 11.3 |
| Mesitylene | 0.9 |
| Isophorone | 1.9 |
| Dihydroisophorone | 1.4 |
| 3,5-xylenol | 22.7 |
| Not identified | 2.4 |
| Water | 8.5 |
| Total | 99.8 |

This shows that upon recycle the intermediate acetone condensation products are either converted almost exclusively to 3,5 - xylenol, or are interconverted among themselves to products which can be converted to the xylenol. Obviously the only by-products not convertible are the methane, necessarily produced, mesitylene and possibly the small amounts (2.4 wt. percent) of unidentified products. This shows that ultimate selectivities to 3,5-xylenol are 90 percent or higher.

Example IV

In order to show the effect of water introduced with the acetone several runs were made at 800° F. using the same commercial MgO catalyst (4) used in the preceding examples and under the same conditions, i.e. reactor, liquid hourly space velocity of 0.25, atmospheric pressure. The results of these runs are shown in Table IV.

TABLE IV

| Run | 1 | 2 | 3 | 4 | 5 | 6 |
|---|---|---|---|---|---|---|
| Feed: | | | | | | |
| Wt. percent $H_2O$ | 0 | 2.4 | 4.8 | 9.6 | 19.2 | 38.3 |
| Wt. percent acetone | 100 | 97.6 | 95.2 | 90.4 | 80.8 | 61.7 |
| Mole percent conversion | 42.4 | 39.1 | 37.4 | 35.8 | 32.3 | 21.0 |
| Mole percent selectivity to— | | | | | | |
| 3,5-xylenol | 22.6 | 25.2 | 26.7 | 31.6 | 34.0 | 25.2 |
| Isophorone | 22.0 | 23.5 | 22.2 | 17.2 | 11.7 | 9.6 |
| Mesityl oxide | 27.6 | 29.4 | 26.9 | 23.1 | 19.0 | 12.4 |

It will be seen from these results that the use of water improves the selectivity for 3,5-xylenol at a give temperature level, but that there is a maximum at about 16 to 20 weight percent.

Example V

In order to demonstrate the effect of pressure runs were made on acetone at 850° F., 0.25 liquid hourly space velocity using the same commercial MgO catalyst (4) and reactor employed in the preceding examples. The results are shown in Table V.

TABLE V

| Pressure, p.s.i.g | 50 | 100 | 150 |
|---|---|---|---|
| Mole percent conversion | 58.7 | 70.4 | 69.5 |
| Mole percent selectivity to— | | | |
| 3,5-xylenol | 44.5 | 41.4 | 38.8 |
| Isophorone | 4.9 | 3.2 | 2.2 |
| Mesityl oxide | 5.0 | 3.7 | 2.9 |

From these data as well as from a large number of pressure runs not enumerated herein it was found that the optimum range was about 50 to 100 p.s.i.g. with pressure giving a mild improvement in conversion and selectivity.

Example VI

A number of runs were made employing a feed consisting of 85 weight percent acetone, 15 weight percent water at 50 p.s.i.g. pressure, 900° F. using the same commercial MgO catalyst (4), reactor and space velocity as employed in the preceding examples.

There was obtained a mole percent conversion of 46.7, a mole percent selectivity to: 3,5-xylenol of 47.7, isophorone of 2.7, and mesityl oxide of 5.1. These results showed a slight improvement in selectivity to the 3,5-xylenol.

In all of the foregoing examples which show only the 3,5-xylenol, isophorone and mesityl oxide selectivities it will be understood that there is a full range of products as set forth in Example III which can be recycled and interconverted as set forth in that example. These were not identified in every run in order to smiplify the analysis.

In calculating molar selectivities the stoichiometry of each reaction was considered. Thus the mole percent selectivity of 3,5-xylenol was calculated by:

$$\frac{\text{Moles of 3,5-xylenol produced} \times 3}{\text{moles of acetone charged}} \times 100$$

since three moles of acetone are required to produce one mole of 3,5-xylenol. Similar calculations were used for the other products. The conversion in mole percent was simply $$\frac{\text{Moles of acetone converted}}{\text{moles of acetone charged}} \times 100$$

The 3,5-xylenol is recovered by conventional methods such as fractionation, crystallization or similar methods employed by those skilled in the art.

Example VII

The foregoing examples have demonstrated the effect of catalyst reaction temperature, recycle, addition of water and pressure on the selectivity and conversion. The runs shown in Table VI show the effect of various diluents on the selectivity of 3,5-xylenol and conversion (as calculated above). In each run the catalyst was the standard commercial MgO catalyst (4) used in Example I, the reactor was that employed in Example I, reaction temperature was 900° F., pressure 50 p.s.i.g., liquid hourly space velocity (volumes of feed/volume of catalyst/hour) was 0.25 and the individual feeds and results are shown for each run.

TABLE VI

| Run number | 1 | 2 | 3 | 4 | 5 |
|---|---|---|---|---|---|
| Feed, wt. percent: | | | | | |
| Acetone | 50 | 75 | 69.8 | 75 | 75 |
| Water | 50 | | 6.9 | | |
| Tetralin | | 25 | 23.3 | | |
| Benzene | | | | 25 | |
| Cyclohexane | | | | | 25 |
| Selectivity (3,5-xylenol) | 50.9 | 41.5 | 49.1 | 39.4 | 39.1 |
| Conversion (acetone) | 44 | 74.2 | 64.3 | 64.8 | 72.7 |

These data show that a hydrocarbon diluent increases conversion of acetone while the use of water with the hydrocarbon gives both high conversion and high selectivity for the 3,5-xylenol. In each of these runs the hydrocarbon diluent was recovered except in the case of the Tetralin which was partially converted to naphthalene.

In standard operation the conversion cycle is carried out at reaction temperature for 6 hours, the feed is then stopped, the reactor purged with nitrogen and the catalyst is then regenerated by burning with air at 900° F. for 2 hours. After again purging with nitrogen the conversion cycle is repeated. It was found that in the absence of a hydrocarbon diluent the activity of the catalyst decreased with repeated regenerations for about three cycles at which time the catalyst reached an equilibrium activity and very little decline, if any, was experienced thereafter.

The following example is provided for the purpose of demonstrating that the use of hydrocarbon diluents stabilize the activity of the catalyst over repeated conversion-regeneration cycles.

Example VIII

The same catalyst and reaction conditions employed in Example VII were also employed in these runs except that in runs 6 and 7 the pressure was atmospheric (0 p.s.i.g.). The conversion-regeneration cycles were 6 hours at 900° F., 2 hours (air at 900° F., respectively, as described above.

TABLE VII

| Run number | 6 | 7 | 8 | 9 | 10 | 11 |
|---|---|---|---|---|---|---|
| Feed, wt. percent: | | | | | | |
| Acetone | 100 | 100 | 50 | 69 | 75 | 69.4 |
| Water | | | 50 | 7 | | 7.5 |
| Mixture of hexane isomers | | | | 24 | | |
| Tetralin | | | | | 25 | |
| Benzene | | | | | | 23.1 |
| Number of conversion-regeneration cycles | 0 | 9 | 9 | 10 | 3 | 6 |
| Selectivity (3,5-xylenol) | 41.4 | 28.2 | 52.4 | 40.9 | 32.7 | 39.6 |
| Conversion (3,5-xylenol) | 46 | 16.7 | 26 | 60.4 | 70.2 | 59.6 |

Comparison of runs 6 and 7 show that the actvity of the catalyst decreased markedly while run 8 shows that even though water was present as a diluent the activity dropped (compare with run 1 of Example VII). In run 9 the selectivity and conversion remained constant over the entire 10 cycles demonstrating the effectiveness of the $C_6$ alkanes for stabilizing the catalyst and also maintaining both a high selectivity and conversion. Runs 10 and 11 also demonstrate that the activity of the catalyst is stabilized with the hydrocarbons of this invention.

Examples VII and VIII show that although water alone gives improvement in selectivity it is necessary to use a hydrocarbon diluent also to get the combined effects of improved selectivity and conversion together with stabilizing the activity of the catalyst.

I claim:

1. In a method for the vapor phase catalytic conversion of acetone to 3,5-xylenol in a single stage which comprises contacting the acetone with a catalyst consisting essentially of magnesium oxide at a reaction temperature ranging from about 700° F. to 950° F. and at a pressure in the range of from about atmospheric to 100 atmospheres, the improvement wherein the acetone is admixed with a hydrocarbon selected from the group consisting of alkanes and aromatics having from 6 to 30 carbon atoms, said hydrocarbon being in an amount of from 5 to 30 weight percent based on the weight of the acetone hydrocarbon mixture.

2. The method according to claim 1, wherein the acetone hydrocarbon mixture is admixed with from 1 to 30 weight percent water based on the total weight of the mixture.

3. The method according to claim 2, wherein the hydrocarbon is hexane.

4. The method according to claim 2, wherein the hydrocarbon is Tetralin.

5. The method according to claim 2, wherein the hydrocarbon is benzene.

6. The method according to claim 2, wherein the hydrocarbon is in the range of from 5 to 30 weight percent and the water is in the range of from 3 to 25 weight percent based on the acetone hydrocarbon-water mixture.

7. The method according to claim 2, wherein the catalyst is periodically regenerated by burning with air, thereby restoring substantially completely its original activity for the conversion of acetone and selectively for production of the 3,5-xylenol.

8. The method according to claim 1 wherein the temperature is in the range of from 750° F. to 925° F. and the liquid hourly space velocity is in the range of from 0.01 to 5.0.

9. The method according to claim 1 wherein the temperature is in the range of from 800° F. to 900° F., the pressure is in the range of from atmospheric to 100 p.s.i.g. and the liquid hourly space velocity is in the range of 0.25 to 1.0.

10. The method according to claim 9 wherein the pressure is in the range of from 50 p.s.i.g. to 100 p.s.i.g.

11. The method according to claim 1 wherein the 3,5-xylenol is recovered from the reaction product and the liquid by-products are recycled to the reaction zone together with fresh acetone.

References Cited

UNITED STATES PATENTS 2,666,771   1/1954   Zettlemoyer et al. 260—62 R X

FOREIGN PATENTS 610,752   1948   Great Britain _____ 260—586 R

LEON ZITVER, Primary Examiner

N. MORGENSTERN, Assistant Examiner

U.S. Cl. X.R.

260—586 R, 593 R, 668 R